United States Patent Office 3,801,500
Patented Apr. 2, 1974

3,801,500
PROCESS FOR FLOCCULATING SOLID PARTICLES FROM AN AQUEOUS SUSPENSION THEREOF
Frederick J. Webb, Akron, and David P. Tate, Northfield, Ohio, assignors to The Firestone Tire & Rubber Company, Akron, Ohio
No Drawing. Original application Aug. 29, 1971, Ser. No. 854,321, now Patent No. 3,647,774, dated Mar. 7, 1972. Divided and this application Sept. 13, 1971, Ser. No. 180,074
The portion of the term of the patent subsequent to Mar. 7, 1989, has been disclaimed
Int. Cl. C08d 5/04; C08f 27/08
U.S. Cl. 210—54        3 Claims

ABSTRACT OF THE DISCLOSURE

This invention comprises water-soluble polymers from polydienes having a substantial amount of repeating units with pendent vinyl groups, such as high-vinyl polybutadiene, and the process for preparing such water-soluble polymers. The process involves the anti-Markownikoff addition of hydrogen bromide to the pendent vinyl groups to give the primary bromide derivative groups, which upon the addition of a tertiary amine, give quaternary ammonium groups which impart water solubility to the polymers. These products are particularly useful for the flocculation of solids from suspensions thereof, such as elutriated sewage.

---

This is a division of application Ser. No. 854,321, filed Aug. 29, 1969 now Pat. No. 3,647,774 issued Mar. 7, 1972.

BACKGROUND OF THE INVENTION

Field of the invention

The present invention relates to water-soluble polymers. More specifically it relates to the process of preparing water-soluble polymers from high-vinyl polydienes, such as polybutadiene, by the addition of hydrogen bromide to give primary bromide derivatives which are solubilized by reaction with tertiary amines.

Description of related prior art

There are a number of references in the prior art to the reaction of halogenated polymers with amines of various types. These are primarily water-insoluble products which are capable of functioning as ion-exchange resins. Some of these include halogenated rubber, such as halogenated natural rubber, halogenated polybutadiene, polychloroprene, polyvinylchloride and the like, reacted with amines. None of the reactions reported have resulted in the formation of water-soluble polymers.

G. Salomon and C. Koningsberger, in Rec. Trav., Chim. 69, 711–723 (1950), describe the hydrohalogenation of synthetic and natural rubber to produce halide derivatives. With a synthetic rubber made from butadiene and styrene, hydrochlorination by these authors produced secondary chloride derivative groups and a small proportion of what is believed to be a tertiary chloride group. In other attempts by them, hydrobromination of natural rubber produced the tertiary brominated product, and attempts to prepare the secondary bromination product using peroxide conditions to effect an anti-Markownikoff reaction were unsuccessful. Thus, secondary halogenation products and tertiary halogenated products have been obtained upon hydrohalogenation of unsaturated polymers. Moreover, as pointed out above, attempts to reverse the Markownikoff rule so as to produce secondary bromide derivatives instead of the tertiary bromide derivative were unsuccessful.

In no instance was any reaction reported in which it was possible to prepare by the hydrohalogenation reaction, products in which the halogen was added to give a primary halide derivative group. Moreover, the reaction of amines with such secondary and tertiary halide derivatives apparently tends to eliminate the halogen without replacement with the amine. Furthermore, in no case has there been reported the reaction of an amine with a halogenated polymer in which the polymeric reaction product is made water-soluble.

SUMMARY OF THE INVENTION

In accordance with the present invention, it has now been found that water-soluble polymers can be prepared by the hydrobromination of polydiene polymers having a high proportion of pendent vinyl groups under conditions which effect an anti-Markownikoff addition, such as in the presence of peroxides, and thereafter reacting the primary brominated polymer with a tertiary amine. The primary bromine is capable of forming with the amine group a quaternary ammonium hydrobromide group which imparts water solubility to the polymer. Where desired, the bromide form of the quaternary ammonium groups can be converted to the chloride form by passing a solution of the same through an anion exchange resin which has been pretreated to deposit chlorine ions in the anion exchange resin.

For the purpose of water solubility, the polymer should have at least 30% of the repeating units therein attached to a quaternary ammonium group, preferably at least 50%. Theoretically, in order for the polymer product to have this amount of quaternary ammonium groups in the final product, it is necessary to have at least a corresponding number of pendent vinyl groups present in the starting polymer. However, since the number of pendent vinyl groups may not be completely converted to quaternary ammonium derivative groups, it is generally preferable to start with at least 30%, preferably at least 80% of the vinyl type butadiene repeating units in the starting polymer.

The molecular weight of the starting polymer is not critical, so long as the proportion of pendent vinyl groups, and eventually the resultant quaternary ammonium derivative groups, are within the ranges specified above. For use as flocculating agents the quaternary ammonium polymers of this invention advantageously have high molecular weights, that is at least 25,000, and preferably in the range of 1,000,000–5,000,000 and even higher.

Although butadiene homopolymers are preferred in the practice of this invention, butadiene copolymers can also be used where the comonomers impart desirable properties and do not detract from the polymer properties. The comonomers can be other dienes, such as isoprene and chloroprene, but can also be vinyl aryl or isopropenyl aryl compounds or derivatives thereof having alkyl, aralkyl, cycloalkyl or chlorine attached to the aromatic nucleus, and preferably having no more than 20 carbon atoms. Typical of these aromatic comonomers are styrene, vinyl toluene, isopropenyl toluene, ethyl styrene, p-cyclohexyl styrene, o-, m- and p-Cl-styrene, vinyl naphthalene, vinyl methyl naphthalene, vinyl butyl naphthalene, vinyl cyclohexyl naphthalene, isopropenyl naphthalene, isopropenyl isopropyl naphthalene, 1-vinyl - 4 - chloronaphthalene, 1-isopropenyl - 5 - chloronaphthalene, vinyl diphenyl, vinyl diphenylethyl, 4-vinyl-4'-methyl - diphenyl, 4 - vinyl - 4'-chlorodiphenyl, and the like.

Since the polymer chain may be degraded during the hydrobromination, it is generally desirable to start with butadiene polymers very high in molecular weight in order to obtain the quaternary ammonium polymers of desired molecular weight. Therefore, it is generally desirable to start with butadiene polymers of at least 100,000 and preferably at least 1,000,000. Preferably such comonomers have no more than 12 carbon atoms. Where such comonomers are to be used, generally at least 1%, preferably at least 5% by weight should be used and as much as 50%, preferably no more than 30% may be used.

Preferably the polydiene is a polybutadiene having at least 30%, preferably at least 80% of the vinyl type of butadiene repeating units therein. Moreover, comonomers can be used provided the high proportion of pendent vinyl groups is attained in the copolymer product. In homopolymers of butadiene the 30% can refer to either weight percent or number of repeating units per 100 repeating units. In copolymers in which the comonomers repeating unit has a different weight from the butadiene repeating unit, the percent is actually given as the weight percent based on the parts by weight of the total number of vinyl-containing repeating units contained in 100 parts by weight of the copolymer.

In the formulas given below, $n$ is an integer representing the number of pendent vinyl repeating units in the polymer and has a value of at least 4 and advantageously represents at least 30% by weight of the repeating units in the polymer. Other types of repeating units are present in butadiene polymers, such as, for example, cis-1,4 and trans-1,4-butadiene repeating units, as well as repeating units of any comonomers that may be present. The other types of repeating units are generally interspersed between the pendent vinyl type of repeating unit but can also be arranged in block formations.

In the hydrobromination step the unsaturation in the cis-1,4 and trans-1,4 repeating units are also hydrobrominated. However the bromine thus added is not displaced to form quaternary groups as is the case with the primary bromine derivatives resulting from the anti-Markownikoff hydrobromination of the pendent vinyl groups. Consequently, the greater the proportion of cis and trans repeating units, the greater will be the proportion of covalent bonded bromine remaining in the ultimate polymer, and the less water-soluble the polymer will be. In contrast, the greater the proportion of pendent vinyl repeating units, the greater will be the proportion of bromine displaced by tertiary amine molecules to give the solubilizing quaternary ammonium radicals having bromine ions associated therewith.

The preparation of the quaternary ammonium polymers of this invention can be represented as follows:

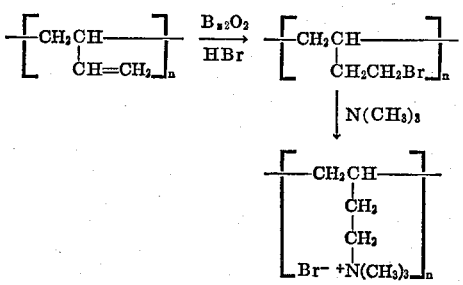

Where desired the Br$^-$ ion can be replaced by the Cl$^-$ as indicated above, in which case both quaternary ammonium repeating units can be represented by the following formula in which X$^-$ represents Br$^-$ or Cl$^-$:

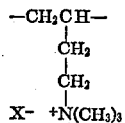

The anti-Markownikoff effect can be achieved with only traces of peroxide as provided by the oxygen present in air, for example by carrying out the reaction in the presence of air, or by adding preformed peroxides in small amounts, such as 0.1% by weight based on weight of polymer. Larger amounts than trace amounts of peroxy compounds may be used up to about 30%. Such larger amounts are advantageous in increasing the rate of hydrobromination, but they are not necessary. Various peroxy compounds can be used such as benzoyl peroxide, lauroyl peroxide, cumyl peroxide, cumyl hydroperoxide, acetyl peroxide, butyl hydroperoxide, t-butylperbenzoate, di-t-butyl diperphthalate, and the like.

Although the number of bromine atoms per polymer molecule in the intermediate polymer and in the quaternized ammonium polymer is the same in view of the fact that the covalently bonded bromine is converted to ionic bromine, the interposing of the —N(CH$_3$)$_3^+$ or other quaternary ammonium radical increases the proportion of non-bromine matter in the polymer molecule and thereby reduces the percent by weight of bromine.

The tertiary amines preferred in the practice of this invention are trimethyl amine and pyridine. Tetramethylethylenediamine and dimethylpiperazine can also be used for quaternization, but since they are difunctional they cause crosslinking. Therefore these are generally used in small percentages as chain extenders in conjunction with trimethylamine or pyridine, particularly when the starting polymers are of low molecular weight or are degraded to low molecular weight during the hydrobromination.

The temperatures for the hydrobromination and for the quaternization are not critical, and merely affect the reaction rate. For practical reaction rates, temperatures of 0–120° C. can be used, but the range of 20–70° C. is found to be most convenient for the hydrobromination and also for quaternization with the amine.

The hydrobromination is best effected under anhydrous conditions with the butadiene polymer dissolved in a hydrocarbon solvent, such as benzene. The hydrogen bromide can be bubbled into the solution until the weight increase indicates that the desired amount has been added. Reaction is almost instantaneous, but reaction can be continued for at least 10 minutes. The hydrobrominated polymer can be separated by pouring the solution into methanol.

The tertiary amine is used advantageously in stoichiometric amount or in slight excess of the amount desired to be reacted. The amine is advantageously used as an aqueous solution, generally 10–30%, preferably 25% by weight concentration. The hydrobrominated polymer can be added to this solution as a solid or as a hydrocarbon solution. As the quaternization proceeds, the polymer becomes more soluble and is dissolved in the water. Thus when the solid has all disappeared or when the polymer in the hydrocarbon solvent has all been reacted and transferred to the water solution, quaternization has been completed and the product is in a water solution convenient for subsequent use.

As previously indicated, these quaternary ammonium polymers are particularly useful for flocculation of suspensions, such as elutriated sewage, various other wastes such as mining and ore waste liquids, for hydrodynamic acceleration, lubricant compositions, water soluble packaging compositions, etc., and can be used for making potable water out of lake and river water. For such purposes the inventor has found that flocculation is more efficient with increased molecular weight of the polymer. Advantageously the molecular weight of the quaternary ammonium polymer is at least 25,000, and preferably at least 1,000,000, and favorably as high as conveniently obtainable.

An elutriated sewage sludge having 6.9% solids and 700% water with no flocculent requires about 19 minutes filtration to give a filter cake of 70% water content, which is a product that can be handled and burned easily. With the polymers of this invention it is possible to produce a product having the water content reduced to 70% within 1.8 minutes; to 65% in 3.5 minutes; and to 60% in 8.3 minutes. If these polymers are used on very dilute sewage as it comes into the sewage plant, it is possible to eliminate settling tanks.

PREFERRED EMBODIMENTS

Various methods of practicing the invention are illustrated by the following examples. These examples are intended merely to illustrate the invention and not in any sense to limit the manner in which the invention may be practiced. The parts ad percentages recited therein and all through the specification, unless specifically provided otherwise, are by weight.

Example I

A solution of 10 gms. of polybutadiene (100,000 molecular weight and 92% pendent vinyl repeating units) and 3 gms. of benzoyl peroxide in 400 ml. of benzene is placed in a 28 oz. bottle and cooled to about 0° C. in an ice bath. Hydrogen bromide is bubbled into the solution until the weight has increased 10.8 gms. The bottle is sealed with a cap having a plastic (Teflon) liner and allowed to warm to room temperature. Then it is placed in a polymerizer in which the bottle is submerged in a bath maintained at 50° C. and rotated for a period of 24 hours. The bottle is cooled, then opened, and the polymer product coagulated by pouring the solution into methanol. The recovered polymer is redissolved in benzene, washed twice with water, neutralized with dilute aqueous potassium hydroxide solution and precipitated in methanol. Then the polymer is redissolved in benzene, filtered, reprecipitated in methanol, air dried and then dried in a vacuum oven at 40–50° C. The polymer has a dilute solution viscosity (DSV) of 0.14, 0% gel and 44.57% bromine.

Example II

A solution of 5 gms. of the hydrobrominated product of Example I and 200 ml. of benzene is placed in a 12 oz. bottle, capped and cooled in Dry Ice. Then 10.4 gms. of trimethylamine is dstilled into the bottle through a hollow needle inserted through a rubber cap liner in the cap of the bottle. The resulting solution is allowed to stand 68.5 hours at room temperature, during which time a solid separates. The benzene solution is dacanted from the separated solid. (Evaporation of the benzene solution yields a residue of approximately 0.1 gm. showing that the polymer product has been substantially completely precipitated from the benzene solution.) The precipitated reaction product is dissolved in methanol, filtered and the solution evaporated to dryness. The residue is a transparent, brittle glasslike material which is soluble in water. The analysis shows: 4.35% nitrogen, 32.45% bromine.

Example IIa

The procedures of Examples I and II are repeated successfully using in one case tetrahydrofurane in place of the benzene as the solvent for the hydrobromination, and in another case using benzene as the solvent, and in both cases adding the trimethylamine as a 25% aqueous solution.

Example III

The polyquaternary ammonium polymer prepared according to Examples II and IIa is tested as a flocculating agent in an elutriated sewage sludge having 6.9% solids. A control test is also run using no flocculant. In each case after the aqueous solution of the flocculating agent is added, filtration is effected on an 11 cm. Buchner funnel under a vacuum of 20 inches of mercury. The time for removal of sufficient water from the sludge to form a tight cake of 70% moisture is drastically reduced with the polyquaternary ammonium polymer in comparison with the control.

Example IIIa

The procedure of Example III is repeated except that the polyquaternary ammonium polymer is first converted from the bromide form to the chloride form by passing an aqueous solution of the polymer from Example II through a column packed with an amino-styrene-divinylbenzene copolymer anion exchange resin which had previously been treated with an aqueous solution of hydrogen chloride, the amount of resin being sufficient to provide at least twice as many amino radicals as the number of bromine atoms to be replaced and the amount of hydrogen chloride in solution form passed through the ion exchange bed being at least twice the stoichiometric amount required to provide enough chloride for complete reaction with the amino groups. The results of the sewage treatment with the chloride form of the polymer are similar to those obtained with the bromide form.

Example IV

Similar improvements are noted when the procedures of Examples I–III are repeated using equivalent amounts of pyridine in place of the trimethylamine. The polymeric repeating unit structure can be represented as follows:

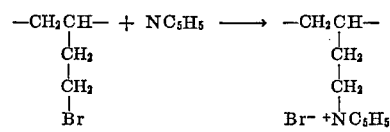

Example V

Ten parts of the hydrobrominated polymer of Example I is stirred for 22 hours at room temperature and 10.5 hours at 40–50° C. with 1000 ml. of 25% aqueous trimethylamine. The polymer has completely dissolved. Evaporation of the resulting light brown solution gives 11.0 parts of a light brown, transparent, brittle polymer having 25.73% bromine and 3.0% nitrogen. Upon testing as a flocculent as in Example III, excellent results are obtained.

Example VI

Improved results are also obtained when the procedures of Examples I, II and III are repeated individually using the following butadiene copolymers, in each case the molecular weight being approximately 300,000 and the percent pendent vinyl repeating units being approximately 70% by weight:

(1) 80–20 butadiene-styrene copolymer
(2) 70–30 butadiene-vinyl toluene
(3) 80–20 butadiene-isoprene
(4) 75–25 butadiene-chloroprene

Example VII

The procedures of Examples I, II and III are repeated a number of times with similar results using in place of the benzoyl peroxide in Example I equivalent amounts respectively of:

(a) Lauroyl peroxide
(b) Cumyl peroxide
(c) Cumyl hydroperoxide
(d) t-Butyl peroxide
(e) Di-t-butyl diperphthalate
(f) t-Butyl perbenzoate While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. The process of flocculating solid particles from an aqueous suspension thereof comprising the step of intimately mixing therewith an aqueous solution of a water-soluble quaternary ammonium polymer having a molecular weight of 25,000–5,000,000 and having in the polymer chain thereof a plurality of quaternary ammonium repeating units having a formula selected from the class consisting of:

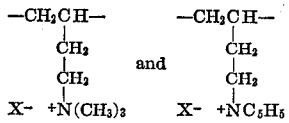

wherein $X^-$ represents $Br^-$ or $Cl^-$, said repeating units comprising at least 30 percent by weight of the total number of repeating units in said polymer, said polymer aqueous solution being added in a quantity to give 0.05–0.4 parts of said polymer per 100 parts of solid particles in said suspension.

2. The process of claim 1 in which $X^-$ in said polymer represents $Br^-$.

3. The process of claim 1 in which said aqueous suspension is elutriated sewage.

References Cited
UNITED STATES PATENTS

| | | | |
|---|---|---|---|
| 3,171,805 | 3/1965 | Suen et al. | 210—54 |
| 3,432,430 | 3/1969 | Levy et al. | 210—54 X |
| 3,647,774 | 3/1972 | Webb et al. | 260—94.7 N X |
| 3,673,164 | 6/1972 | Jones et al. | 210—54 X |

JAMES A. SEIDLECK, Primary Examiner

W. F. HAMROCK, Assistant Examiner

U.S. Cl. X.R.

260—94.7 N, 94.7 HA

UNITED STATES PATENT OFFICE
CERTIFICATE OF CORRECTION

Patent No. 3,801,500      Dated April 2, 1974

Inventor(s) Frederick J. Webb and David P. Tate

It is certified that error appears in the above-identified patent and that said Letters Patent are hereby corrected as shown below:

In Column 5, Line 6, "ad" should read --and--.

In Column 5, Line 36, "dstilled" should read --distilled--.

In Column 5, Line 41, "dacanted" should read --decanted--.

Signed and sealed this 24th day of September 1974.

(SEAL)
Attest:

McCOY M. GIBSON JR.
Attesting Officer

C. MARSHALL DANN
Commissioner of Patents